United States Patent [19]
Greenspan

[11] Patent Number: 5,349,618
[45] Date of Patent: Sep. 20, 1994

[54] BWR FUEL ASSEMBLY HAVING OXIDE AND HYDRIDE FUEL

[76] Inventor: Ehud Greenspan, 4 Captain Dr. #407, Emeryville, Calif. 94608

[21] Appl. No.: 941,530

[22] Filed: Sep. 9, 1992

[51] Int. Cl.$^5$ .............................................. G21C 3/30
[52] U.S. Cl. ................................... 376/429; 376/435; 252/636
[58] Field of Search ............... 376/428, 429, 431, 433, 376/435, 423, 426, 340, 171, 901; 252/636, 640; 976/DIG. 283

[56] References Cited

U.S. PATENT DOCUMENTS

| | | | |
|---|---|---|---|
| 3,145,149 | 8/1964 | Imhoff | 376/370 |
| 3,145,150 | 8/1964 | Gylfe | 376/423 |
| 3,627,633 | 12/1971 | Magladry | 376/209 |
| 4,071,587 | 1/1978 | Eggers | 264/0.5 |
| 4,127,443 | 11/1978 | Wetch et al. | 376/346 |
| 4,493,809 | 1/1985 | Simnad | 376/171 |
| 4,591,479 | 5/1986 | Weitzberg | 376/349 |
| 4,652,427 | 3/1987 | Uchikawa et al. | 376/447 |

*Primary Examiner*—Peter A. Nelson
*Assistant Examiner*—Meena Chelliah

[57] ABSTRACT

A boiling water nuclear reactor used for the production of electricity includes fuel rods and an assembly of these fuel rods that improve the reactor economics and safety. The fuel assemblies include hydride fuel pellets at selected axial and radial positions in addition to oxide fuel pellets. The hydride fuel functions simultaneously as a fuel and as a moderator. The hydride fuel can be made from different combinations of fissionable materials such as uranium, and hydrides such as zirconium hydride. The hydride fuel (such as $U-ZrH_{1.6}$) is substituted for oxide fuel ($UO_2$) in undermoderated regions of the core. Hydride fuel rods also replace water rods in the fuel assemblies. The use of hydrogen containing fuel rods and fuel assemblies enable flattening the power distribution across the core; reducing the need for power shaping with burnable poisons and control rods; improving the nuclear fuel utilization; increasing the reactor availability; increasing the safety factors for fuel meltdown accidents or, alternatively, increasing the power output from a given size core; reducing the cold shutdown reactivity margin; and reducing the leakage of neutrons from the core.

30 Claims, 9 Drawing Sheets

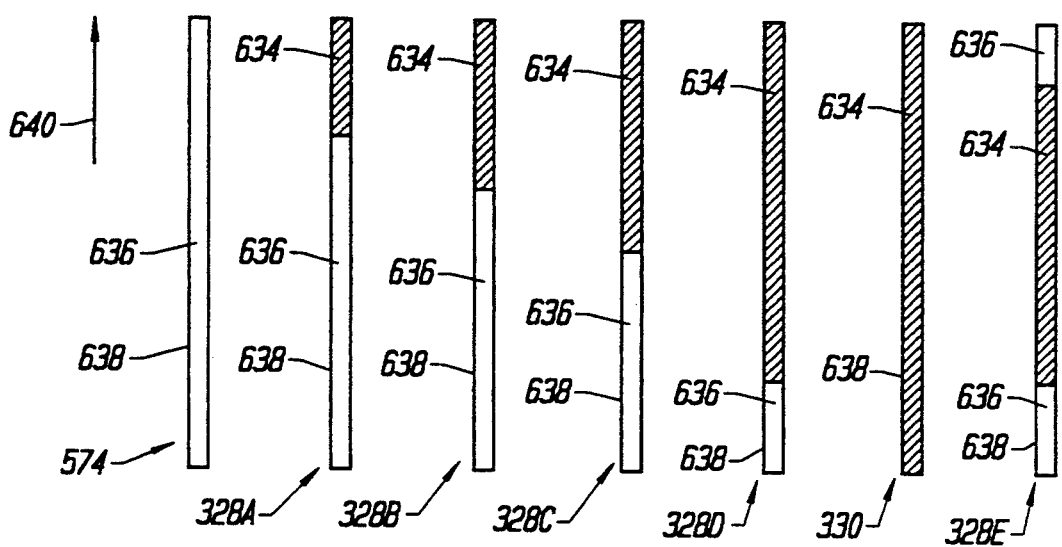

BWR FUEL ASSEMBLY HAVING OXIDE AND HYDRIDE FUEL

BACKGROUND OF THE INVENTION

1. Field of the Invention

This invention relates generally to boiling water nuclear reactors (BWRs) and more particularly to nuclear fuel assemblies and the fuel rods used in BWRs for electrical power generation.

2. Description of Related Art

The generation of heat energy through fission of nuclear fuel in a nuclear reactor is well known. The nuclear fuel is located in the core of the reactor. Typically, the core of a light-water reactor (LWR) contains a plurality of fuel assemblies that each contain a plurality of fuel rods. The fuel rods are arranged with their axes along the vertical direction. Typically, a fuel rod consists of a metal cylindrical cladding that contains a stack of fuel pellets. The fuel pellet material, the size of the fuel pellets, the cladding material and the orientation of the fuel pellets within the fuel rod are all well known for commercial LWRs used in electric power production.

The radial spacing between fuel rods is filled with water, which flows in the axial direction from the bottom of the core to its top. The water carries away heat from the reactor core that is generated by fission reactions within the fuel rods. Hence, the water acts as the core coolant. The water also slows down, i.e., moderates, neutrons which are emitted at high velocities from the fission reactions. Hence, the water acts also as a neutron moderator.

The moderation of high velocity fission neutrons occurs as a result, primarily, of collisions between the neutrons and the nuclei of hydrogen atoms in the water. Consequently, the degree of moderation is a function of the number of hydrogen atoms per unit volume, for example, per cubic centimeter. As the water is heated, the water expands and so the number of hydrogen atoms per cubic centimeter decreases. When the water boils and is converted to steam, the number of hydrogen atoms per cubic centimeter decreases even further. Consequently, a region of a reactor core in which the steam occupies a significant fraction of the volume available for the coolant is undermoderated. That is, neutrons in such a region are not sufficiently moderated.

The moderation of a fission neutron, i.e, the lowering of the energy of the fission neutron, increases the probability that the neutron is absorbed in the nuclear fuel so as to cause another fission reaction which in turn releases additional high energy neutrons. When neutrons from one fission reaction cause, on the average, one other fission reaction to occur, a chain reaction is established. To generate power, a chain reaction must be established and maintained in a LWR.

The probability for achieving a chain reaction is sometimes measured by a multiplication constant and is denoted by K. In LWRs, the neutron moderation provided by the coolant makes it possible to obtain a nuclear chain-reaction, i.e., a K of one, using nuclear fuel having a relatively small concentration of a fissile isotope.

Typical LWR fuel contains uranium in which the concentration of the fissile isotope uranium-235 is enriched from the 0.71% found in natural uranium to approximately 3%. The remaining 97% of the uranium is the non-fissile isotope uranium-238. One objective in nuclear power reactor design is to lower the fuel enrichment because this reduces the nuclear fuel cost and enhances uranium resource utilization.

The enrichment of the fuel loaded into the core is chosen so that the multiplication constant K is sufficiently higher than one so that the LWR can be operated for a significant period of time, usually about 12 to 18 months, without refueling. During this period of operation, sometimes referred to as a cycle, multiplication constant K is reduced to or near one as a result of depletion, i.e., burnup, of the fissile fuel and the accumulation of neutron absorbing fission products. The deviation of multiplication constant K from unity at any instant during the cycle, commonly referred to as reactivity and equal to $(K-1)/K$, is offset by insertion into the core of strong neutron absorbing materials. The strong neutron absorbing materials are introduced into the core in a variety of ways, e.g., via the insertion of control rods, via inclusion of burnable poisons in the fuel, via addition of boron to the water, or via a combination of these measures.

The rate at which heat can be generated per unit length of a fuel rod, sometimes referred to as the linear-heat-rate, is limited by the ability of the water to carry this heat out of the core without having the fuel temperature and the cladding temperature exceed predetermined permissible values. The maximum permissible linear-heat-rate translates, in a given core, to the maximum power density, or power generated per unit volume of the core at the specific location under consideration.

The power density in a LWR varies across the core both axially and radially. The power density tends to drop at the core periphery because there is an increased probability that fission neutrons will leak out of the core without causing another fission reaction. The power density also tends to drop in the vicinity of control rods. The control rods, which are used to regulate the chain-reaction, contain materials, such as boron, that have a large capture probability for moderated neutrons. The power density is usually depressed also in core regions which are undermoderated relative to other core regions.

The depressions in power density are undesirable except, possibly, near the core periphery. The flatter the power density, i.e, the more the power density is constant across the core, the smaller the size of the core required to generate a given amount of electricity and consequently the more economical the reactor. Alternatively, the flatter the power density of a core of a given volume and power, the longer the residence time of the fuel in the reactor which also improves the reactor economics. The advantages of a flat power distribution have been widely recognized, but such distributions are limited by other factors, which are described more completely below.

FIG. 1 illustrates a cross-sectional view of a portion of a typical boiling water reactor BWR core 20 containing a plurality of a rectilinear fuel assemblies 12 and a plurality of control rods 24. (A boiling water reactor is one type of a LWR.) Each fuel assembly 12 includes a square channel 21 that encloses an array of fuel rods and water rods.

A gap 22 exists between all fuel assemblies 12. Gap 22 is filled with water and is called a "water gap." Gap 22 is used for the insertion of control rods 24, when necessary. The non-specified dimensions, materials, and other parameters, components and instruments associated with or part of the BWR of these and subsequent figures are conventional and are well-known to those skilled in the art.

Examples of typical BWR fuel assemblies are depicted and described in U.S. Pat. No. 3,350,275, entitled "Reactor Fuel Assembly Device" issued to Venier et al. on Oct. 31, 1967; U.S. Pat. No. 3,466,226, entitled "Nuclear Fuel Element" issued to Lass on Sep. 9, 1969; U.S. Pat. No. 3,802,995, entitled "Nuclear Fuel assembly" issued to Fritz et al. on Apr. 9, 1974; and U.S. Pat. No. 4,664,882, entitled "Segmented Fuel and Moderator Rod" issued to Doshi on May 12, 1987, all of which are incorporated herein by reference in their entirety.

Typical BWR fuel assemblies include a 7×7, an 8×8, a 9×9, or a 10×10 array of rods. For example, in an 8×8 array, the fuel assembly contains 62 fuel rods and two water rods. See for example, U.S. Pat. No. 3,802,995, entitled "Nuclear Fuel Assembly" issued to Fritz et al. on Apr. 9, 1974. A primary purpose of the water rods, which are typically in the interior of the fuel assembly, is to provide additional moderation.

BWR fuel assembly 12 may also include all fuel rods. A drawback of a BWR fuel assembly with all fuel rods is that the central region of the fuel assembly is undermoderated relative to the fuel assembly periphery, as the water of water gaps 24 contributes to neutron moderation near this periphery. One consequence of this undermoderation is that the power density at the central part of the assembly is lower than at the periphery of the assembly. The resulting nonuniform radial power distribution across the fuel assemblies has a negative effect on the BWR economics. This is so because such a power distribution limits the total power output and the uranium fuel utilization of fuel assembly 12.

While the water rods mitigate the undermoderation in the central region of fuel assembly 12, the water rods reduce the amount of fuel per assembly. Consequently, the total power that can be obtained from the BWR core and the fuel residence time in the BWR is limited by either the water rods or the nonflattened radial power distribution in a fuel assembly when the water rods are eliminated.

Weitzberg proposed in U.S. Pat. No. 4,591,479, entitled "Boiling Water Reactor Fuel Bundle," and issued on May 27, 1986 to improve the moderation in the central region of a BWR fuel assembly by replacing fuel pellets in a certain number of fuel rods in the center region of the assembly by pellets made of zirconium hydride. However, this approach is less effective and more expensive than the use of water rods.

In a BWR, the coolant, i.e., water, flows axially from the bottom of the core to the top of the core. As the water moves through the core, the water is heated by the heat generated in the fuel rods. In fact, the water starts to boil and to create steam before leaving the core. From the boiling initiation point upwards, the amount of liquid decreases and the amount of vapor, i.e., steam, increases. The larger the volume fraction occupied by the steam, the smaller becomes the number of hydrogen atoms per unit volume and the smaller becomes the moderation capability of the water. Thus, BWR cores are highly undermoderated in the upper region where steam is formed and the undermoderation increases as the volume of steam increases higher in the core region.

As a result of the undermoderation in the upper regions of the core, the fission rate and, hence, the axial power density is highly asymmetric unless measures are taken to flatten the axial power distribution. A typical axial power distribution is illustrated in FIG. 2. The axial power density tends to peak in the lower part of the core and to strongly decline near the top of the core.

If uncorrected, this non-uniform axial power shape can limit the overall reactor power output, as the peak power density can not exceed a given limit. The non-uniform axial power shape results in an uneven axial burn-up of the fuel. At the beginning-of-life of the fuel assembly, the rate of fuel consumption at the lower part of the assembly is significantly higher than at the upper part of the assembly. This non-uniform fuel consumption impairs overall fuel utilization.

Moreover, near the end of a cycle, the depleted fuel at the bottom core results in a lower fission rate which in turn reduces the amount of heat transferred into the water at the lower part of the core. Thus, with time the onset of boiling moves higher up the core. As the steam volume fraction decreases, the reactivity in the upper part of the core becomes significantly higher than the reactivity at the lower part of the core. This reactivity imbalance can impair reactor safety as it reduces the effectiveness of the control and safety rods, which in a BWR enter the core from its bottom. Specifically, the highly non-uniform fuel consumption can reduce the cold shutdown reactivity margin as well as prolong the time it takes to quickly shut-down, i.e., scram, the reactor.

Another drawback of the undermoderation in the upper region of a BWR core is that a significant fraction of the fission neutrons born in the region leak out of the core before being moderated. These relatively energetic neutrons damage components located in the vicinity of the core.

A number of measures are presently being used in boiling water reactors to modify the axial power shape so as to minimize the disadvantages of the asymmetric axial power distribution. These measures include the use of control rods and of consumable neutron absorbing materials, also known as burnable poisons.

Burnable poisons, such as gadolinium, are generally incorporated within the fuel rod unevenly, with the highest concentration in the lower part of the rod. Having a large probability of absorbing moderated neutrons, the burnable poison reduces the fission probability and, hence, suppresses the fission density. In addition, control rods are partially inserted into the core from its bottom, thereby absorbing moderated neutrons and thus suppressing fissions in this part of the core.

Both of these methods of axial power shaping have an adverse effect on the fuel utilization in a BWR. If the number of neutrons absorbed in the burnable poisons and in the control rods were reduced, either the enrichment of the uranium loaded into the BWR could be reduced or the fuel residence time and burnup in the reactor could be increased. Both of these changes could improve the BWR economics. Moreover, both of these methods of axial power shaping do not eliminate the safety and neutron damage drawbacks resulting from the significant undermoderation in the upper part of the BWR core.

A number of design modifications were proposed for eliminating or reducing the drawbacks associated with undermoderation of the upper part of a BWR core. In U.S. Pat. No. 3,145,149, entitled "Boiling Nuclear Reactor and Fuel Element Therefor" and issued Aug. 18, 1964, Imhoff suggested fuel rod designs in which the average quantity of fuel per unit length of fuel rod decreases towards the top of the core. Although this design reduces the degree of undermoderation in a BWR, the design significantly complicates the fuel rod fabrication. Furthermore, this design raises safety concerns. For example, fuel from upper pellets may disintegrate, fall through the central gap, and accumulate in a lower part of the fuel rod. This might lead to fuel and/or cladding meltdown which is a very undesirable accident.

Gylfe, in U.S. Pat. No. 3,145,150, entitled "Fuel-Moderator Element for a Nuclear Reactor and Method of Making" and issued Aug. 18, 1964, proposed to use fuel rods having a double wall cladding. The inner clad was a tube made of a hydride material, e.g., zirconium hydride, that was filled with fuel pellets and cladded on the outside, with a thin layer of stainless steel or another material. As the number of hydrogen atoms per unit volume of zirconium hydride is comparable to hydrogen density in liquid water at room temperature, the zirconium hydride is an effective moderator material. Thus, the zirconium hydride as the primary fuel rod cladding material reduces the level of undermoderation in the upper part of a BWR core. A drawback of this scheme is that if the zirconium hydride cladding is made thick enough so as to provide significant moderation, the resistance of the zirconium hydride cladding to heat transfer significantly increases the fuel temperature. This may limit the power which can be extracted from a fuel rod and, hence, from a core of a given size.

Weitzberg, in U.S. Pat. No. 4,591,479, entitled "Boiling Water Reactor Fuel Bundle," and issued on May 27, 1986, proposed to improve the moderation at the upper part of BWR cores by replacing fuel pellets at the upper part of a certain fraction of the fuel rods by pellets made of a solid moderator, such as zirconium hydride. Unfortunately, replacement of fuel pellets with zirconium hydride pellets reduces the amount of fuel and the total length of fuel rods in the core which in turn cancels most, if not all, of the improvement due to the increased moderation. Another drawback is that the zirconium of the zirconium hydride absorb a significant fraction of the moderated neutrons.

Uchikawa et al., in U.S. Pat. No. 4,652,427 entitled "Fuel Assembly," and issued on Mar. 24, 1987, proposed to incorporate in a BWR fuel assembly a number of rods which contain burnable poisons mixed with a solid moderating material. A drawback is that this assembly does not significantly improve the undermoderation in the boiling part of the core. Another drawback is that it limits the amount of fuel and the total length of fuel rods which can be loaded into the BWR core.

Doshi, in U.S. Pat. No. 4,664,882, entitled "Segmented Fuel and Moderator Rod," and issued on May 12, 1987, proposed to improve the moderation in the upper part of a BWR core by replacing one or more conventional fuel rods with segmented rods which contain fuel pellets in their lower part and water in their higher part. A drawback of this invention is that it reduces the amount of fuel and the total length of fuel rods in the core.

Taleyarkhan, in U.S. Pat. No. 4,818,478, entitled "BWR Fuel Assembly Mini-Bundle Having Interior Fuel Rods of Reduced Diameter," and issued on Apr. 4, 1989, proposed to improve the moderation across the BWR fuel assembly by dividing an 8×8 fuel rod lattice into four 4×4 bundles that are separated by a cross shaped water gap in between. Moreover, the four inner fuel rods of each bundle are to have a smaller diameter, so as to provide more volume for water. A drawback of Taleyarkhan's invention is that it is more complicated than present BWR fuel assembly designs. Another drawback of this invention is that it does not significantly reduce the large variation in the degree of moderation along the fuel assembly.

Typically, modern BWRs have a thermal power rating of 3000 to 4000 Megawatts, a fuel rod length of about four meters and a fuel rod outer diameter of about 1.25 centimeters (cm). The fuel, in the form of cylindrical pellets, is enclosed within a zircaloy, i.e., a zirconium alloy tube (also referred to as the cladding), nearly 0.9 millimeters (mm) in thickness. The fuel used by all BWRs is uranium oxide ($UO_2$). In fact, with very few exceptions, oxide fuel is used in all the commercial power reactors operating around the world, including in pressurized water reactors (PWR), heavy water reactors (HWR) and even in liquid metal cooled reactors (LMR). The exceptions are a small number of gas cooled reactors (GCR) which use a metallic uranium alloy for their fuel. Metallic uranium alloy is also being considered for LMR under development in the USA. High temperature gas cooled reactors (HTGR) under development are designed to use uranium carbide and, possibly, also uranium oxide fuel.

With one exception, the fuel for reactors used for research rather than for power production is a metallic uranium alloy, uranium oxide or uranium silicide. The exception is the so called TRIGA reactor which uses a hydride of a uranium-zirconium alloy for its fuel. Typically, the TRIGA reactor fuel rods are about 30 cm in length and about 3.5 cm in outer diameter and use 0.5 mm thick stainless steel cladding. The uranium-zirconium hydride composition used for the TRIGA fuel has, typically, 1.6 hydrogen atoms per zirconium atom, denoted as $U-ZrH_{1.6}$. Details about the TRIGA fuel fabrication, properties and performance can be found in many publications, such as in the General Atomics report GA-A16029 by M. T. Simnad entitled "The U-ZrHx Alloy: Its Properties and Use in TRIGA Fuel" (Aug. 1980).

The hydride fuel was selected for the TRIGA reactor primarily for its large negative effect on reactivity as the fuel temperature rises. This large temperature coefficient of reactivity enables the TRIGA reactor to generate power pulses, for the purpose of conducting various kinds of experiments. The power pulsing capability is one of the unique features of TRIGA reactors.

Compared with a BWR core, a TRIGA core is small, has a low average power output and operates at low temperatures. Hence, a TRIGA core and the conditions under which a TRIGA core is operated are different from those of a BWR core.

The small size of the TRIGA core means that larger fraction of fission neutrons leak from the core than in a BWR core. Thus, TRIGA reactor fuel needs a larger enrichment of uranium-235 to maintain the chain reaction. Traditionally, TRIGA fuel contained nearly 10 wt. % uranium that was enriched to more than 70% in U-235. Following the adoption of policies by the U.S. Government to limit the export of fuels to those enriched to less than 20% in U-235, General Atomic of San Diego, Calif. developed TRIGA fuel containing up to 45 wt. % uranium. For TRIGA and any other application of this fuel type, the uranium enrichment was 20% or very close to 20%. Whereas the former type of TRIGA fuel belongs to the category of Highly Enriched Uranium (HEU) fuel, the latter and present type of TRIGA fuel belongs to the category of Medium Enriched Uranium (MEU) fuel. Commercial light water reactors fuel use a Low Enriched Uranium (LEU) fuel.

The uranium-zirconium hydride in the composition of this enriched fuel is reported by General Atomics to be stable and operational at temperatures up to 700° C. (See above cited General Atomic reference). In fact, uranium-zirconium hydride fuel rods were successfully operated with linear-heat-rates comparable to the maximum linear-heat-rate a typical BWR fuel is designed to operate.

The TRIGA core, in addition to its high enrichment and small size compared to a BWR core, is more symmetric than a BWR core. In particular, the partial water voiding associated with boiling is not encountered in a TRIGA core. Consequently, the upper part of the TRIGA core is as well moderated as its lower (or any other) part, and its power distribution is more symmetric than in a BWR core. Further, the TRIGA core is not subjected to the safety issues encountered in BWR cores due to the voiding of the upper part of these cores.

Typically, neither the TRIGA reactor, nor any other type of research or power reactor, uses a combination of hydride and non-hydride fuel materials for their fuel. Moreover, due to the low weight percent (of about 10%) and the high enrichment (above about 70%) of the HEU in the uranium-zirconium hydride fuel developed for the original TRIGA reactors and used for many years in many TRIGA reactors around the world, the uranium-zirconium hydride has been considered as inadequate as a fuel for power reactors such as BWRs. Even the MEU fuel developed in the mid-seventies for TRIGA reactors is expensive and commonly considered as inadequate as a fuel for power reactors such as BWRs. Thus, for example, Glasstone and Sesonske, in their well known "Nuclear Reactor Engineering" text and reference book (Van Nostrand Reinhold Co., Third Edition, 1981), do not even refer to uranium-zirconium hydride, or to any other hydride material as a candidate fuel material for nuclear power reactors. The types of fuel materials they refer to are metallic, oxide, carbide and nitride.

SUMMARY OF THE INVENTION

According to the principles of this invention, novel fuel rods and a novel assembly of these fuel rods are used in a boiling water reactor (BWR) to improve the reactor performance in comparison to conventional BWRs that are in use for electric power generation. In the prior art BWRs, the fuel was made of uranium oxide ($UO_2$) and was referred to as an oxide fuel. According to the principles of this invention, in regions where undermoderation occurs, a hydride fuel is substituted for the oxide fuel. Thus, one embodiment of the novel fuel rod of this invention has a first length fueled with an oxide fuel and a second length fueled with a hydride fuel.

Whereas the oxide fuel has but a very small contribution to the slowing-down of the fission neutrons, the hydride fuel contains a large enough quantity of hydrogen and makes a good moderator in addition to being a fuel material. Thus, by using the hydride fuel instead of oxide fuel in undermoderated regions of the fuel assembly, the neutron moderation is improved without reducing the overall length of fuel in the assembly. Similarly, by replacing water rods, or rods containing another non-fuel moderator (such as zirconium hydride) with hydride fuel, the total length of fuel in the assembly is increased without significantly reducing the moderation ability of the fuel assembly.

Relative to prior-art designs, the fuel assemblies of this invention increase the total power and/or total amount of energy which can be extracted from a BWR core of a given size. In particular, the fuel rods preferably include hydride fuel pellets at selected axial and radial positions within the core so as to improve axial and radial power profiles. Moreover, by placing hydride fuel in the upper part of the BWR core, the neutron moderation ability of this core region increases and the leakage of high energy neutrons is reduced. Therefore, the fission density in this core region increases, making additional contribution to the flattening of the power distribution.

The use of hydride fuel permits elimination of water rods, part of the burnable poisons and reduction of the use of control rods in the prior art BWRs to achieve more uniform power distribution and burnup over the core during the irradiation cycle. It also improves safety and simplifies control of BWRs.

According to the principles of this invention, the basic geometry of the BWR core including the fuel rods and fuel assemblies is not changed. Rather, the fuel pellets used in the fuel rods and the axial and radial composition of the fuel within a fuel assembly are modified to provide enhanced performance. While axial and radial dimensions are referred to herein with respect to a BWR core, these dimensional references are illustrative only of the principles of this invention and are not intended to limit the invention to the particular dimensions described. More generally, the axial dimension is a dimension in a first direction and the radial dimension is a dimension in a second direction where the second direction is orthogonal to the first direction. The coolant flow through the BWR core is in the first direction.

In one embodiment of this invention, the oxide fuel pellets are located in that part of the fuel rod surrounded by non-boiling coolant and by boiling coolant with a steam volume fraction, also referred to as void fraction, of less than about 40%. The hydride fuel pellets are located in the region surrounded by boiling coolant that has a void fraction from about 40% up to the void fraction at the coolant exit from the core, i.e., the high void fraction part of the core. However, the starting point for the hydride fuel pellets may be any place in the range of from the onset of boiling up to a 70% void fraction. The actual position is selected so as to maintain as near as possible a uniform power distribution in the direction of coolant flow. Thus, since the fuel rod has a total fueled length in a first direction, a first fueled length is occupied by the oxide fuel pellets. A second fueled length is occupied by the hydride fuel pellets.

Henceforth, a fuel rod containing both oxide fuel pellets and hydride fuel pellets is referred to as a mixed hydride-oxide fuel rod. A fuel rod containing oxide fuel pellets only is referred to as an all-oxide fuel rod. A fuel rod containing hydride fuel pellets only is referred to as an all-hydride fuel rod.

There are various possibilities for arranging mixed hydride-oxide fuel rods and all-hydride fuel rods within a fuel assembly. In one embodiment, a number of the innermost fuel rods are all-hydride fuel rods, whereas the rest of the fuel rods are mixed hydride-oxide fuel rods. The all-hydride fuel rods can be arranged in different ways in the inner part of the fuel assembly. In one arrangement they are adjacent to each other, forming a region of all-hydride fuel rods at the center region of the assembly. In another arrangement they are intermixed with mixed hydride-oxide fuel rods in the inner part, i.e., center region, of the assembly.

In a second embodiment, a first plurality of fuel rods in a fuel assembly are mixed hydride-oxide fuel rods, a second plurality of fuel rods in the fuel assembly are all-hydride fuel rods, and a third plurality of fuel rods in the fuel assembly are all-oxide fuel rods.

Many other embodiments are possible using the novel fuel rods of this invention. One embodiment uses all-hydride fuel rods located at the inner region of the fuel assembly with the rest of the fuel rods being all-oxide fuel rods. Another embodiment uses mixed hydride-oxide fuel rods throughout the assembly. Yet another embodiment uses only mixed hydride-oxide fuel rods and all-oxide fuel rods.

The novel fuel rods and fuel assemblies of this invention reduce the cost of generating electricity in BWRs. The BWR economics is improved by reducing the fraction of the fission neutrons that are absorbed in burnable poisons and in control rods and that leak-out through, primarily, the undermoderated portions of the core, thus improving BWR fuel utilization. The BWR economics is improved also by increasing the amount of energy which is extracted from a given fuel loading. This increase in energy generation and, hence, also in the fuel residence time in the core, is due to the increase in the overall fuel loading in the core and to the flatter power density distribution across the core.

In addition, the safety of BWRs is improved by reducing the maximum power density these reactors need to operate at if they are required to deliver a given power output. The present fuel assemblies further improve the safety of BWRs by increasing the shutdown reactivity margin as well as by maintaining the effectiveness of the control rods more constant throughout the fuel cycle.

Yet another improvement of the present fuel assemblies is a reduction of the fast neutron leakage from the upper part of the BWR core and, consequently, a reduction in the neutron induced damage rate to the structural components located near by the core.

BRIEF DESCRIPTION OF THE DRAWINGS

FIGS. 6A to 6G show a schematic elevation view of the fuel arrangement (i) in an all-oxide fuel rod in accordance with the prior art (FIG. 6A), (ii) in an all-hydride fuel rod in accordance with the present invention (FIG. 6F) and (iii) in a plurality of mixed hydride-oxide fuel rods also in accordance with the present invention (FIGS. 6B to 6E and 6G).

DETAILED DESCRIPTION

Figure 1:
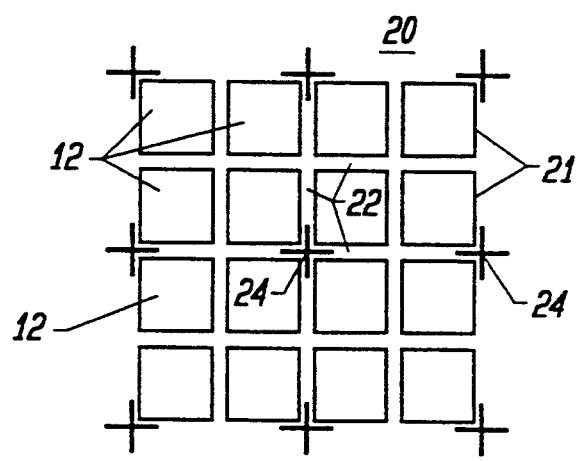
FIG. 1 is a top view of a portion of a BWR core showing a plurality of fuel assemblies and control rods in accordance with the prior art.
Figure 2:
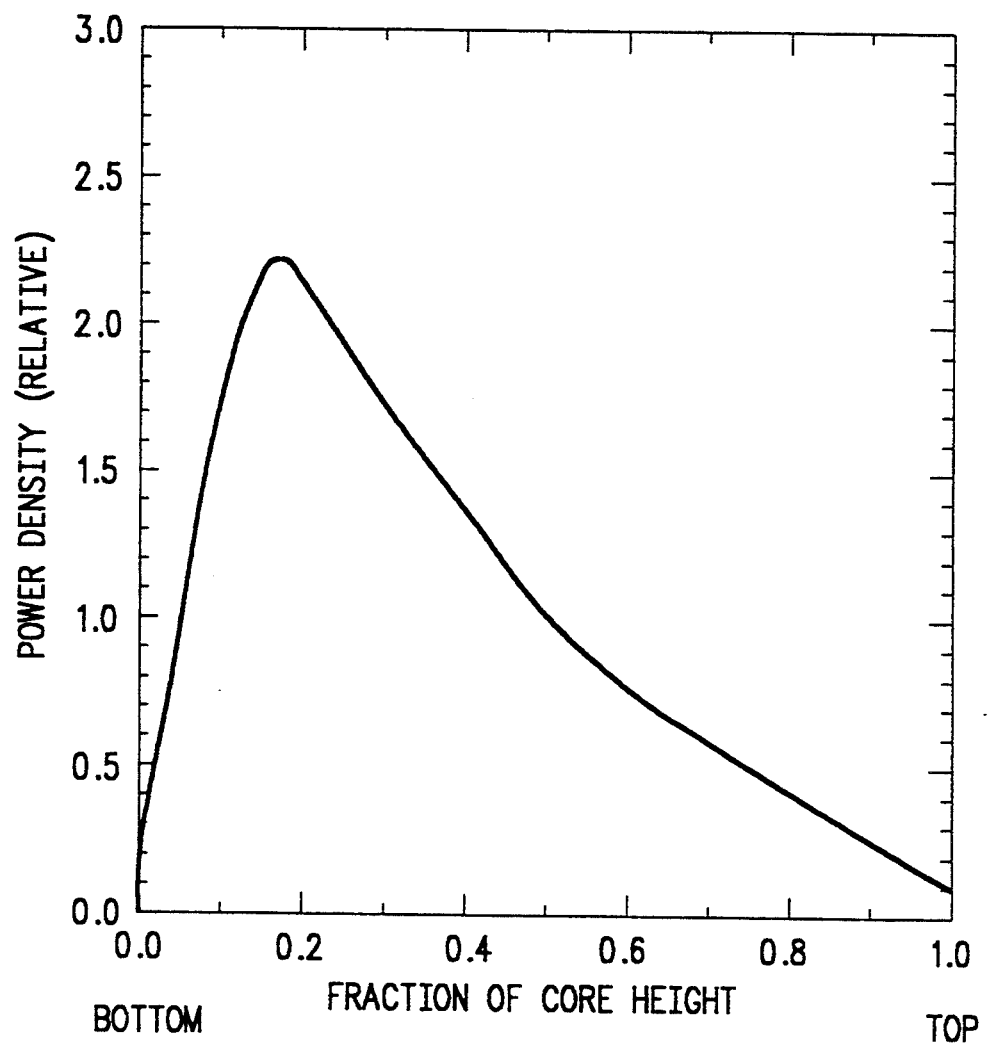
FIG. 2 is an example of an axial power profile in a prior art BWR core.

According to the principles of this invention, a boiling water nuclear reactor, preferably used for the generation of electricity, includes novel fuel rods and novel assemblies of these fuel rods that improve the reactor performance in comparison to conventional BWRs that are in use for electric power generation. In particular, as described more completely below, hydride fuel pellets are included at selected axial and radial positions within the core so as to improve the neutron moderation while increasing the total length of fuel rods in the core.

Herein "hydride fuel" refers to a material which includes hydrogen and at least one fissionable material among its constituents. The fissionable material includes at least one of the fissile isotopes uranium-233, uranium-235, plutonium-239 and plutonium-241. The hydride fuel functions simultaneously as a fuel and as a moderator. The location and concentration of the hydride fuel is adjusted within a fuel rod and within a fuel assembly, as described more completely below, to achieve a more uniform power density. When the hydride fuel is substituted for oxide fuel in undermoderated regions of the core, the fuel itself provides additional moderation.

Herein, "oxide fuel" refers to the composition of fuel that is made of the oxide of at least one fissionable material, such as uranium and plutonium. In the presently operating BWRs, the oxide fuel is, typically, uranium oxide ($UO_2$).

Neutrons are moderated better in the core regions where the hydride fuel is substituted for the oxide fuel and the multiplication constant increases in these regions. Therefore, more fissions occur so that enhanced power production is achieved in these regions of the core. Consequently, the moderation provided by the hydride fuel in undermoderated regions flattens the power distribution across the core. This more uniform power distribution permits reduction of the use of burnable poisons and of control rods for power shaping, as used in the prior art BWRs, which in turn improves the fuel utilization, the reactor availability, and the reactor safety. Additional improvement in the fuel utilization, reactor availability and reactor safety is obtained by substituting hydride fuel rods for water rods in the interior of the BWR fuel assemblies, thus increasing the overall length of fuel pellets in the assembly without compromising the moderation capability.

According to the principles of this invention, the basic geometry of the BWR core including the fuel rods and fuel assemblies is not changed. Rather, the fuel pellets used in the fuel rods and the axial and radial composition of the fuel within a fuel assembly are modified to provide enhanced performance. While axial and radial dimensions are referred to herein with respect to a BWR core, these dimensional references are illustrative only of the principles of this invention and are not intended to limit the invention to the particular dimensions described. More generally, the axial dimension is a dimension in a first direction and the radial dimension is a dimension in a second direction where the second direction is orthogonal to the first direction. In view of this disclosure, those skilled in the art can implement the invention in a wide variety of geometries.

In a preferred embodiment, the BWR uranium oxide fuel pellets of the prior art are utilized within the novel fuel rods of this invention along with uranium-zirconium hydride pellets. The uranium oxide is slightly enriched in the fissile isotope uranium-235 ($^{235}U$). However, as is known to those skilled in the art, a mixed uranium-plutonium oxide may also be utilized in place of uranium oxide.

As described above, a novel fuel rod of this invention includes hydride fuel pellets which in the preferred embodiment are made of uranium-zirconium hydride (U-ZrH$_x$). The number of hydrogen atom per zirconium atom in the uranium-zirconium hydride fuel, denoted above by the x subscript, ranges from zero to about two, and is preferably about 1.6 to 1.7. The weight percent (wt %) of the uranium in the uranium-zirconium hydride fuel ranges from about 30 wt % to about 60 wt %, and is preferably about 45 wt % uranium. The uranium used for the uranium-zirconium hydride fuel is low-enriched uranium (LEU). The enrichment of the uranium ranges from about 2% to about 6%.

In the preferred embodiment of this invention, all the hydride fuel pellets used in a given BWR core use the same weight percent uranium and the same ratio of hydrogen to zirconium atoms. In other embodiments of this invention, the uranium weight percent and the hydrogen-to-zirconium atom ratio vary with the location of the hydride fuel within the fuel rod, with the location of the fuel rod within the assembly, as well as with the location of the fuel assembly within the core. Such variations provide an optimal match between the hydride fuel, the oxide fuel, and the variation in the void fraction in the coolant.

The enrichment of the uranium in the hydride fuel typically varies with the location of the hydride fuel in the core. The number of enrichment levels used within one core ranges from one to about ten, and is preferably between 2 and 4. This is similar to the number of enrichment levels of the oxide fuel used in state-of-the-art BWRs.

The selection of the optimal location for placement of hydride fuel pellets within the core, of the hydrogen-to-zirconium atom ratio, of the weight percent uranium, and of the uranium enrichment for each hydride fuel pellet can be determined by those skilled in the art by using state-of-the-art computer codes for core design and optimization. (Herein, state-of-the-art computer codes refers to those codes in common use by nuclear engineers for design of the prior art BWR fuel described above.) Accordingly, the following examples are illustrative of the principles of this invention, but the examples are not intended to limit the invention to the specific embodiments disclosed herein.

Figure 3A:
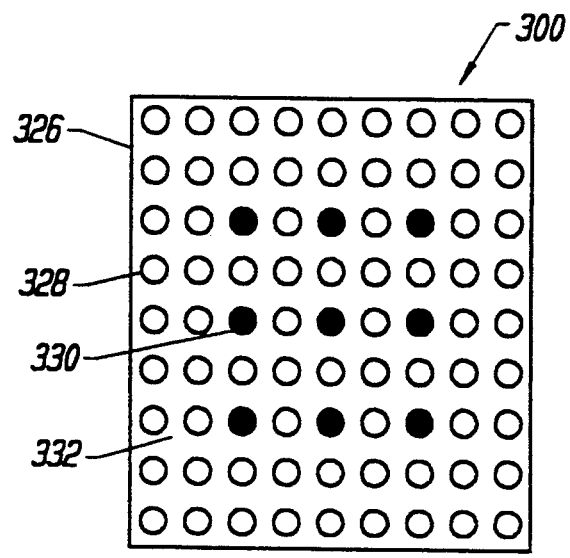
FIG. 3A is a cross-sectional view of a 9×9 BWR fuel assembly including the all-hydride fuel rods and the mixed hydride-oxide fuel rods of this invention which are arranged in accordance with one embodiment of the present invention.

In a first embodiment, a first plurality of fuel rods in a fuel assembly includes both oxide and hydride fuel pellets and a second plurality of fuel rods in the fuel assembly include only hydride fuel pellets. For example, BWR fuel assembly 300 (FIG. 3A) includes a total of 81 fuel rods in a 9×9 array. Seventy-two of fuel rods 328, the first plurality, contain both oxide fuel pellets and hydride fuel pellets (mixed hydride-oxide fuel rods) while nine of fuel rods 330, the second plurality, contain only hydride fuel pellets (all-hydride fuel rods). All-hydride fuel rods 330 are arranged within a 3×3 array in which a mixed hydride-oxide rod 328 is used to separate all-hydride rods 330.

Figure 3B:
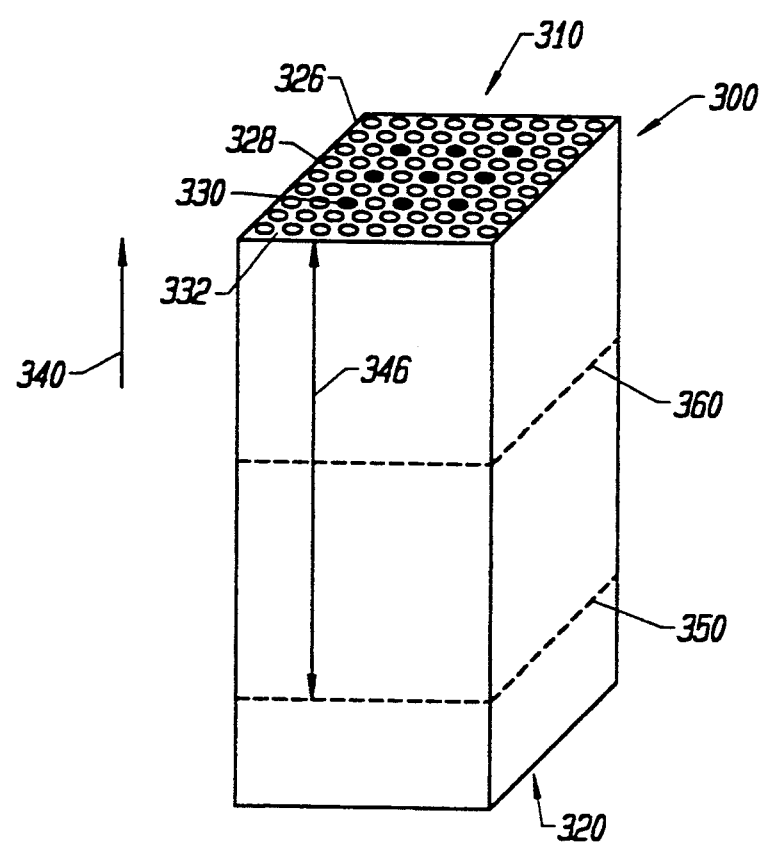
FIG. 3B is a perspective view of the 9×9 BWR fuel assembly of FIG. 3A.

FIG. 3B is another conceptual view of fuel assembly 300. Fuel assembly 300 contains 81 fuel rods in channel 326. The coolant, i.e., water, enters at bottom 320 of channel 326 and flows through space 332 between the fuel rods in axial direction 340 and exits at top 310. As the water flows up through fuel assembly 300, the water is heated and begins to boil at about the location shown by dotted line 350. The steam volume fraction, i.e., the void fraction increases as the water flows upward of dotted line 350 in axial direction 340 and reaches about seventy percent at top 310. Thus, upper region 346 of fuel assembly 300 contains steam, which for neutron moderation acts like a void. In mixed hydride-oxide rods 328, the oxide fuel pellets are, in this embodiment, located below line 360 and the hydride fuel pellets are located above line 360, where line 360 is between onset of boiling line 350 and assembly top 310.

The exact preferred location for line 360 can be determined by those skilled in the art by using the state-of-the-art computer codes for core design and optimization. The void fraction in the vicinity of line 360 ranges between 0% to 70%, and is preferably between about 30% to 50%. Thus, fuel rod 328 has a total fueled length in a first direction. A first fueled length is occupied by the oxide fuel pellets. A second fueled length is occupied by the hydride fuel pellets. The second fueled length is smaller than the portion of the fueled length of fuel rod 328 surrounded by a coolant with a non-zero void fraction, i.e, portion 346 of fuel rod 328 above line 350. The compensation in neutron moderation achieved by using the hydride fuel pellets in the region of the core having a void fraction is described more completely below.

Figure 4A:
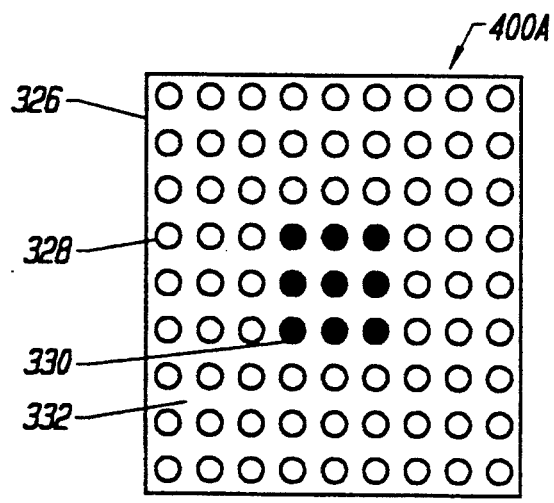
FIGS. 4A to 4C are cross sectional views of BWR fuel assemblies with a number of combinations of mixed hydride-oxide fuel rods and all-hydride fuel rods in accordance with the present invention.
Figure 4B:
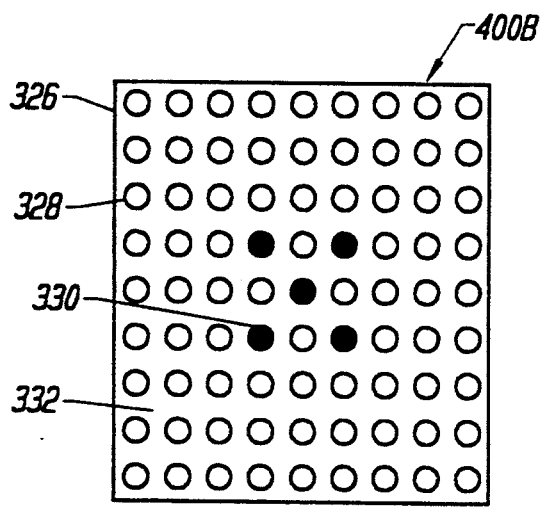
Figure 4C:
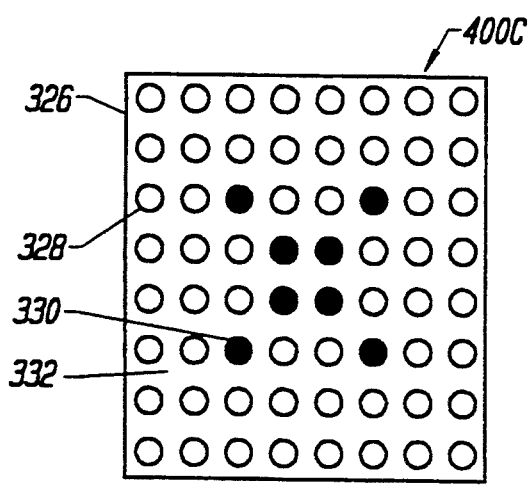

There are various possibilities for arranging mixed hydride-oxide fuel rods 328 and all-hydride fuel rods 330 within fuel assembly 326. In 9×9 fuel assembly 400A (FIG. 4A) the nine innermost fuel rods are all-hydride fuel rods 330, whereas the rest of the fuel rods are mixed hydride-oxide fuel rods 328. Notice that fuel rods 330 are in the interior of fuel assembly 400A and fuel rods 328 surround fuel rods 330. In 9×9 fuel assembly 400B (FIG. 4B), only five fuel rods are all-hydride fuel rods 330, whereas the rest of the fuel rods are mixed hydride-oxide fuel rods 328. The innermost fuel rod is an all-hydride fuel rod 330 and in the eight rods surrounding the innermost fuel rod that form a square, the corner fuel rods of the square are also all-hydride fuel rods 330. Notice again that fuel rods 330 are in the interior of fuel assembly 400B and fuel rods 328 surround fuel rods 330. In 8×8 BWR fuel assembly 400C (FIG. 4C), eight of the fuel rods are all-hydride fuel rods 330 and the rest of the fuel rods are mixed hydride-oxide fuel rods 328.

Figure 5:
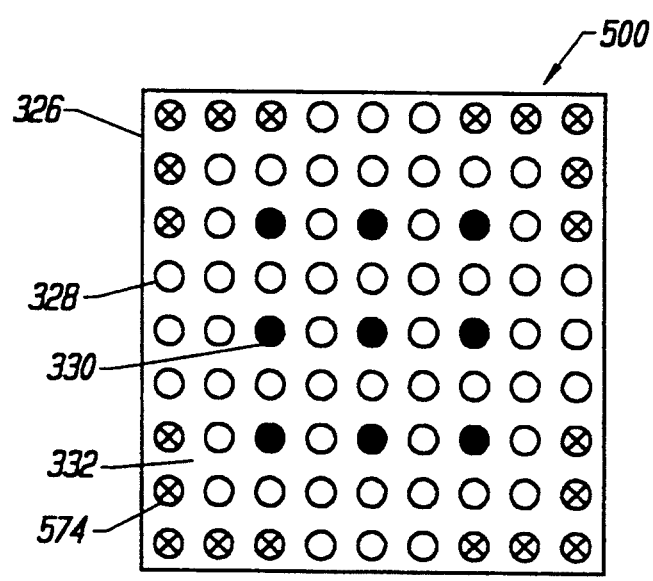
FIG. 5 is a cross sectional view of a 9×9 BWR fuel assembly with a combination of mixed hydride-oxide fuel rods, all-hydride fuel rods, and all-oxide fuel rods in accordance with the present invention.

In a second embodiment, a first plurality of fuel rods in a fuel assembly are mixed hydride-oxide fuel rods, a second plurality of fuel rods in the fuel assembly are all-hydride fuel rods, and a third plurality of fuel rods in the fuel assembly are all-oxide fuel rods. For example, BWR fuel assembly 500 (FIG. 5) includes a total of 81 fuel rods in a 9×9 array. Fifty-two fuel rods 328, the first plurality, contain both oxide and hydride fuel pellets (mixed hydride-oxide fuel rods) while nine fuel rods 330, the second plurality, contain only hydride fuel pellets (all-hydride fuel rods). Twenty fuel rods 574 contain only oxide fuel pellets (all-oxide fuel rods). All-hydride fuel rods 330 are arranged within a 3×3 array in which a mixed hydride-oxide fuel rod 328 is used to separate all-hydride fuel rods 330.

Many other embodiments are possible using the novel fuel rods of this invention. One embodiment uses all-hydride fuel rods located at the inner region of the fuel assembly with the rest of the fuel rods being all-oxide fuel rods. Such fuel assemblies are identical to those illustrated in FIGS. 4A, 4B, 4C, and 5 except that mixed hydride-oxide fuel rods 328 are replaced by all-oxide fuel rods 574. Another embodiment uses mixed hydride-oxide fuel rods 328 throughout the assembly. Yet another embodiment uses only mixed hydride-oxide fuel rods 328 and all-oxide fuel rods 574. In this embodiment, the hydride-oxide fuel rods are preferably surrounded by the all-oxide fuel rods. Of course, any of the fuel assemblies of this invention may contain one or more water rods or rods containing solid moderators, as proposed for BWRs which do not use hydride fuel. Also, the all-hydride and mixed hydride-oxide fuel rods may contain burnable poisons, such as the burnable poisons used in state-of-the-art BWRs.

As is known to those skilled in the art, the onset of boiling in a BWR fuel assembly and the volume fraction occupied by voids at different locations along the assembly first direction vary with the reactor power level, coolant flow rate, coolant inlet temperature, control-rods position, location of burnable poisons, level of fuel burnup, as well as other core design and operating conditions. Typically, multi-dimensional coupled neutronic and thermal hydraulic computer codes are used to determine the optimal composition of a particular fuel rod in a particular fuel assembly during a particular cycle of the reactor. In this embodiment, the fuel rod contains hydride fuel from or above the point of onset of boiling for that particular fuel rod to the top of the fueled region of the fuel rod, and typically from a point where the void fraction is in the range of 30% to 50% to the top of the fueled region. Alternatively, as described above, the entire fuel rod may contain only hydride fuel. Thus, the hydride fuel may occupy from zero to one hundred percent of the fueled length in a fuel rod. An important aspect of the invention is that, unlike prior art designs that traded moderation for fuel volume, the fuel rods of this invention provide improved moderation in regions of the core that are under-moderated and simultaneously maintain the fuel volume.

Several alternative embodiments for the axial distribution of the oxide fuel and hydride fuel within a fuel rod are illustrated in FIGS. 6A through 6G. Fuel rod 574 (FIG. 6A) contains only oxide fuel 636 while fuel rod 330 (FIG. 6F) contains only hydride fuel 634. Fuel rods 328A (FIG. 6B), 328B (FIG. 6C), 328C (FIG. 6D) and 328D (FIG. 6E) contain differing amounts of oxide fuel 636 and hydride fuel 634. The point of transition from oxide fuel 636 to hydride fuel 634 is determined for each BWR design and operating plan using coupled neutronic and thermal-hydraulic computer codes in use by those skilled in the art of BWR core design. Note that FIGS. 6A to 6G refer to the fueled region of the fuel rods. As is known to those skilled in the art, a fuel rod includes a plenum above the fuel pellets, and end caps.

Fuel rod 328D (FIG. 6E) is referred to as a "predominantly-hydride fuel rod". Fuel rod 328D may be substituted in fuel assembly locations otherwise occupied by all-hydride fuel rods 330 (FIG. 6F). Oxide fuel pellets 636 are used at the lower part of the fuel rod where the neutron density and, therefore, power density tend to decline due to neutron leakage from the bottom of the core. The use of oxide fuel pellets 636 instead of hydride fuel pellets 634 in this relatively low neutron density lower core region will increase the power generated in this region relative to the power generated in the same region when using all-hydride fuel rods. In predominantly-hydride fuel rod 328D, the hydride fuel occupies at least the upper two thirds of the fueled length of the fuel rod. In a typical embodiment, the oxide fuel in fuel rod 328D is confined to the lower one eighth to one sixth of the rod where the neutron density is lower than in the upper core regions and where the steam volume fraction is negligible.

Fuel rod 328E (FIG. 6G) is another embodiment of mixed hydride-oxide fuel rod. It uses oxide pellets 636 at its far top, in addition to oxide pellets 636 at its lower part. Typically, the volume of oxide pellets 636 at the top of fuel rod 328E is small, so that the use of oxide fuel at this highly voided core region will not significantly reduce the average multiplication constant of the upper part of the core. Solid moderator can be placed in the reflector right above the upper oxide fuel pellets to compensate for the lack of hydrogen in the oxide fuel. The purpose of placing the oxide fuel at the top is to increase the power density in the upper core region where the neutron density declines due to leakage.

The fuel in all the fuel rods of this invention is contained within a cladding 638 (FIGS. 6A to 6G) made of, for example, the zirconium alloy "zircaloy". The mechanical design of the fuel rods for the innovative mixed hydride-oxide fuel rods 328 and all-hydride fuel rods 330 and the fuel assemblies containing these fuel rods are similar to the mechanical design of the all-oxide fuel rods and fuel assemblies used for typical prior art BWRs. Examples of such typical nuclear fuel assemblies were depicted and described in the above-identified patents of Venier et al., Lass, and Fritz et al.

The fuel rods of this invention differ from the typical BWR fuel rods in their fuel composition and their cladding design. In any of the fuel rods of this invention containing a hydride fuel, gaseous hydrogen fills the small gap between the pellets and the fuel rod cladding, as well as the volume of the plenum above the pellets. The free hydrogen gas may hydrogenize the cladding material, or diffuse out through it. Hydrogenization of the cladding material may impair its mechanical integrity and is preferably prevented. If hydrogen gas permeates through the cladding, the hydrogen gas pressure inside the cladding drops, and part of the hydrogen dissociates from the hydride fuel pellets and become free hydrogen. Thus, if the hydrogen permeation rate is large, the dissociation of the hydride fuel may impair its neutron moderation ability.

To avoid impairment of the mechanical integrity of the fuel rod cladding and lose of an unacceptably large fraction of the hydrogen of the hydride fuel, the hydride fuel pellets are surrounded by a sealed hydrogen permeation barrier. Several different embodiments are available for designing this hydrogen permeation barrier. In the preferred embodiment, the hydrogen permeation barrier design is the design proposed by Weitzberg for zirconium hydride moderator containing fuel rods in his above identified patent. FIGS. 7A, 7B, 7C, 7D and 7E illustrate a partial elevation view cross-section of fuel rods for a number of embodiments.

Figures 7A, 7B, 7C, 7D, 7E:
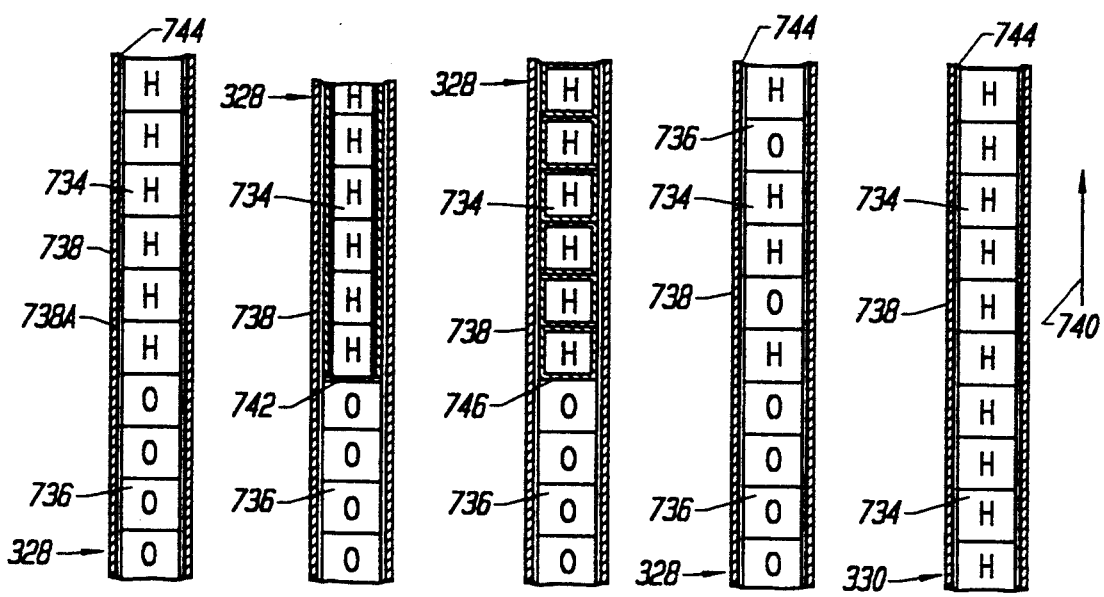
FIGS. 7A to 7E show a partial elevation view cross-section of a number embodiments of the mixed hydride-oxide fuel rods and of an all-hydride fuel rod in accordance with the present invention.

In the embodiment illustrated in FIG. 7A, oxide fuel pellets 736, which are indicated by the capital letter "O", fill the lower part of fuel rod 328 while hydride fuel pellets 734, which are indicated by the capital letter "H", fill the upper part of fuel rod 328. There is no barrier between oxide fuel pellets 736 and hydride fuel pellets 734. Between fuel rod cladding 738 and pellets 734, 736 there is a barrier 744 to inhibit the permeation of hydrogen through cladding 738 to the water which surrounds this cladding. Barrier 744 is either a coating on internal side 738A of cladding 738 or a cylindrical sleeve with an inner surface adjacent pellets 734, 736 and an outer surface adjacent internal side 738A of cladding 738.

The coating or sleeve is made of a material having (i) no hydrogenization, (ii) a high resistance to hydrogen permeation, and (iii) preferably a relatively low probability for neutron absorption. As used herein, "a high resistance to hydrogen permeation" is a resistance that prevents the loss of more than 50% and, preferably, of more than 10% of the hydrogen content of the hydride pellets during the residence time of these pellets in the core. Also as used herein, "a relatively low probability for neutron absorption" is measured relative to the probability for a neutron absorption in the fuel. As is known to those skilled in the art, the fission neutrons are preferably moderated and absorbed in the fuel.

Different materials and material thicknesses are possible for hydrogen permeation barrier 744. One preferred embodiment is a layer of stainless steel, typically 0.05 to 0.1 mm in thickness. Such a barrier is proposed by Gylfe in his above-identified patent. Preferably, the stainless steel is oxidized to further improve its hydrogen retention capability. In another embodiment, hydrogen permeation barrier 744 is an oxidation layer on internal side 738A of zircaloy cladding 738. In still another embodiment, internal side 738A of zircaloy cladding 738 is a glass-enamel coating, as suggested in the above-identified Weitzberg patent. According to Weitzberg, glass-enamel coating metal cladding, about 0.08 mm thick, has been successfully utilized in SNAP reactors at temperatures up to 700° C.

Of course, cladding 738 may be made from a material, such as stainless steel, which does not interact with hydrogen and which has a high resistance to hydrogen permeation. Such a cladding is used in TRIGA reactors. Although the simplest to implement, the latter approach is the most wasteful on neutrons, as the stainless steel has a higher neutron absorption probability than zirconium.

In the embodiment illustrated in FIG. 7B, oxide fuel pellets 736 again fill the lower part of the fuel rod while hydride fuel pellets 734 are in the upper part. Hydrogen permeation cladding barrier 742 is a special material layer which encloses, i.e., clads, all hydride pellets 734 and is contained within fuel rod cladding 738. Hydrogen permeation barrier cladding 742 for hydride fuel pellets 734 extends, in one embodiment, above the upper most hydride fuel pellet to provide a plenum for accumulating gaseous fission products that are emitted from hydride fuel pellets 734. Hydrogen permeation barrier cladding 742 is one of stainless steel, a glass-enamel coated metal cladding, and any other material having high resistance to hydrogen permeation and low neutron absorption probability.

In the embodiment of FIG. 7C, oxide fuel pellets 736 and hydride fuel pellets 734 are oriented as described above in the two previous embodiments. Each hydride fuel pellet 734 is surrounded by a hydrogen permeation barrier 746 in the form of a cladding or coating and the cladded (coated) hydride fuel pellet is contained within fuel rod cladding 738.

In the embodiment of FIG. 7D, there is not a single boundary between hydride fuel pellets 734 and oxide fuel pellets 736. The transition from the completely oxide fuel region to completely hydride fuel region within the fuel rod is done gradually. Hydrogen permeation barrier 744, as described above for FIG. 7A, is utilized and that description is incorporated herein by reference. Alternatively, each hydride fuel pellet 734 is individually encased as illustrated in FIG. 7C. Of course, another alternative is to individually encase each hydride fuel pellet 734 in any transition regions, and each group of hydride fuel pellets 734 in fuel rod 728 are to use hydrogen permeation barrier 742 (FIG. 7B). This embodiment is a combination of embodiments 746 and 742.

In fuel rod 330 (FIG. 7E) with all-hydride fuel pellets 734, any one of the embodiments 744, 742 and 746 may be used. In FIG. 7E, hydrogen permeation barrier 744 is illustrated.

The density of hydrogen atoms per unit volume of U-ZrH$_{1.6}$, the preferred fuel, is approximately $4.7 \times 10^{22}$ hydrogen atoms per cubic centimeter of fuel. This is very close to the hydrogen density of $4.8 \times 10^{22}$ in liquid water at the BWR operating temperature of about 280° C. As in a typical BWR the volume of fuel in a fuel rod is nearly 62% of the volume of water which surrounds the fuel rod, the hydride fuel significantly increases the hydrogen content in the fuel assembly.

Table 1 compares the relative amounts of hydrogen in selected elevations in the fuel assembly, when the preferred hydride fuel is used instead of the regular oxide fuel. The elevations considered feature the steam volume fractions given in Table 1. In the fuel assembly regions in which the void fraction is less than 60%, the use of the hydride fuel increases the hydrogen content to above its value in the reference BWR assembly lower section which does not experience boiling. At the outlet from the fuel assembly, where the void fraction is nearly 70%, the replacement of oxide fuel by the hydride fuel increases the hydrogen content by nearly three fold, bringing the hydrogen content to 90% of its value at the bottom of the reference BWR core. The effect of the improved moderation provided by the hydride fuel on the axial power profile is described more completely below.

TABLE 1

| Assembly Hydrogen Content With The Hydride Fuel | | | | | |
|---|---|---|---|---|---|
| Void fraction (%) | 0 | 40 | 50 | 60 | 70 |
| Relative to liquid water | 1.6 | 1.2 | 1.1 | 1.0 | 0.9 |

TABLE 1-continued

| Assembly Hydrogen Content With The Hydride Fuel | | | | | |
| --- | --- | --- | --- | --- | --- |
| Void fraction (%) | 0 | 40 | 50 | 60 | 70 |
| Relative to oxide fuel | 1.6 | 2.0 | 2.2 | 2.5 | 3.0 |

When the preferred hydride fuel rod is used to replace the water rods or water rod segments within a prior art BWR fuel assembly, the hydrogen density in these rods and rod segments changes insignificantly. Thus, the hydride fuel provides practically the same improvement in moderation as provided by the special water rods, while adding nuclear fuel to these rods. The fuel addition converts these rods and rod segments to power producing, thus making a better utilization of the fuel assembly volume.

In the above embodiment, a hydride fuel has been used to offset the problems that result from undermoderation associated with boiling or with uneven moderation resulting from the existence of water-gaps in-between the fuel assemblies in a BWR. The uranium-zirconium hydride fuel is illustrative only of the principles of this invention and is not intended to limit the invention to the particular fuel described. In view of this disclosure those skilled in the art will be able to use a variety of fissile isotopes containing fissionable materials and hydride materials to form a hydride fuel suitable for use in the fuel rod. Other hydride fuel materials include, but are not limited to, uranium and plutonium containing hydrides of thorium, titanium, cerium and yttrium.

In another promising embodiment of this invention, the hydride fuel used in undermoderated regions of the core is uranium-thorium hydride (U-ThH$_x$). The number of hydrogen atoms per thorium atom in this fuel material can range from about one to about three and is preferably about 2. Details about the properties and fabrication of the uranium-thorium hydride fuel U-ThH$_x$ can be found in U.S. Pat. No. 4,493,809 by Simnad (1/85). The uranium-thorium hydride fuel U-ThH$_x$ is incorporated in the BWR fuel rods as pellets, just as the uranium-zirconium hydride fuel U-ZrH$_x$ described above was incorporated.

Relative to uranium-zirconium hydride, the uranium-thorium hydride fuel offers a better neutron economy, as the neutrons captured in thorium convert it to the fissile isotope uranium-233. The longer the uranium-thorium hydride fuel is irradiated in the BWR, the higher will be the U-233 concentration and the larger will be the contribution of this U-233 to the chain reaction, or reactivity of the core. So far there is only little experience in the fabrication of uranium-thorium hydride. Little is known also on the behavior of the uranium-thorium hydride fuel in BWR operating conditions.

While the advantages of this invention have been demonstrated with respect to BWRs where the problems of undermoderation are most profound, the principles of this invention are applicable to undermoderation in other type of nuclear reactors.

For example, in pressurized water reactors (PWRs) hydride fuel rods would replace control rod thimbles in those fuel assemblies which do not house control rods. The power attainable from the fuel assemblies of the present invention can be higher by nearly 10% than the power attainable from conventional PWR fuel assemblies. Alternatively, for the same power output, the PWR fuel assemblies of the present invention can reside longer in the PWR core and generate more energy than conventional PWR fuel assemblies.

In above described embodiments of this invention, the hydride fuel pellet is homogenous in the sense that the fissionable material and the hydride are highly mixed. In another embodiment, the hydride fuel pellet is heterogeneous. One illustration of such an heterogeneous fuel is a fuel made of zirconium hydride ZrH$_x$ into which small grains of uranium oxide UO$_2$ are imbedded.

Figures 8, 9:
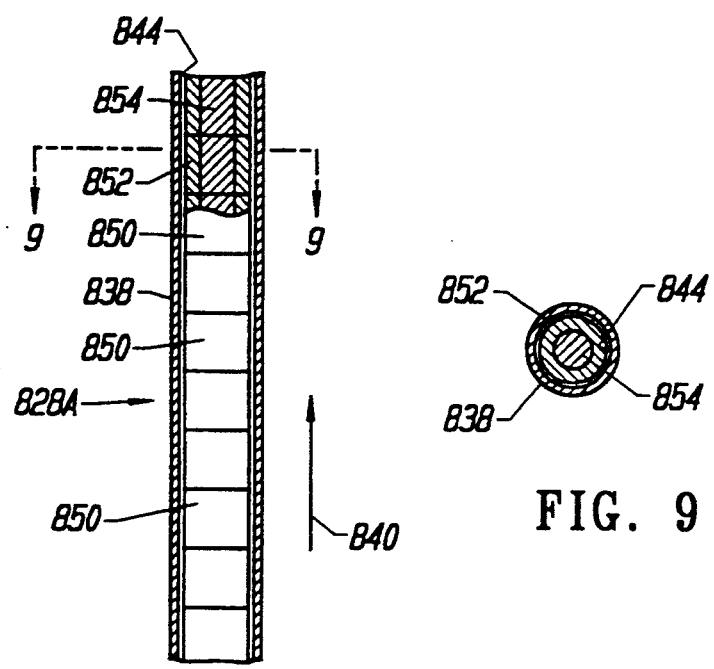
FIG. 8 is a partial elevation view of a fuel rod having two-zone pellets with a hydride inner zone and an oxide outer zone in accordance with another embodiment of the present invention.
FIG. 9 is a cross-section view along line 8—8 of FIG. 8.

A more extreme heterogeneity is illustrated in FIGS. 8 and 9 which show two-zone fuel pellets 850 having a cylindrical hydride inner zone 854 and a uranium oxide outer zone 852. Outer zone 852 is an annulus surrounding inner zone 854. Except for the specifics of the design of pellet 850, fuel rod 828A (FIG. 8) is the same as fuel rod 328 of FIG. 7A.

Hydride materials suitable for inner zone 854 of two-zone pellet 850 includes but are not limited to zirconium hydride ZrH$_x$. The volume fraction of inner hydride zone 854 is adjusted in accordance with the design requirements for fuel rod 828A. Outer region 852 of the two-zone pellet 850 may include any fissionable material.

The replacement of the oxide fuel with hydride fuel in the upper part of fuel rods adds a significant amount of hydrogen to the BWR core regions in which the water substantially boils which in turn eliminates or, at least, highly reduces the undermoderation. Moreover, the addition of hydrogen to the otherwise undermoderated core regions is done along with the inclusion of fissile fuel with the solid moderator thus maximizing the weight of fuel and the total length of fuel rods which can be loaded into the BWR core while using BWR fuel assemblies that have a mechanical design similar to that of existing BWRs. Other prior art designs for alleviating the undermoderation compromised fuel volume for increased moderation.

The improvement in the performance of a BWR made possible by the present invention is illustrated by considering an infinite array of BWR hydride fuel rods surrounded by water, to be referred to as the hydride fuel lattices, in comparison to an infinite array of BWR oxide fuel rods. The dimensions and composition of the oxide fuel lattices in the array of BWR oxide fuel rods are of a typical BWR design. The fuel pellet outside diameter is 1.0566 cm. The zircaloy cladding inside diameter is 1.0795 cm. The fuel rod outside diameter is 1.2522 cm. The distance between fuel rod centers is 1.6256 cm. The dimensions and composition of the hydride fuel lattices in the array of BWR hydride fuel rods are identical in all respects to the oxide fuel lattices with the exception to the fuel composition, which is U-ZrH$_{1.6}$ having 45 wt. % uranium. The barrier to hydrogen permeation in the hydride fuel is taken to be a 0.1 mm layer of zirconium oxide.

The oxide fuel has a characteristic beginning-of-life enrichment of 2.07%, whereas the uranium enrichment of the hydride fuel is taken as 2.07% in one embodiment and 3.0% in another embodiment. The characteristics of the three fuel rod lattices as a function of the void fraction in the water moderator surrounding the fuel rods in the lattice were determined using the WIMS lattice code using 69 energy groups of the WIMS cross-section library. The WIMS lattice code and the WIMS cross-section library is available from the Radiation Shielding Information Center of the Oak Ridge National Laboratory having Post Office Box 2008 Oak Ridge, Tenn., 37831-6362.

Figure 10:
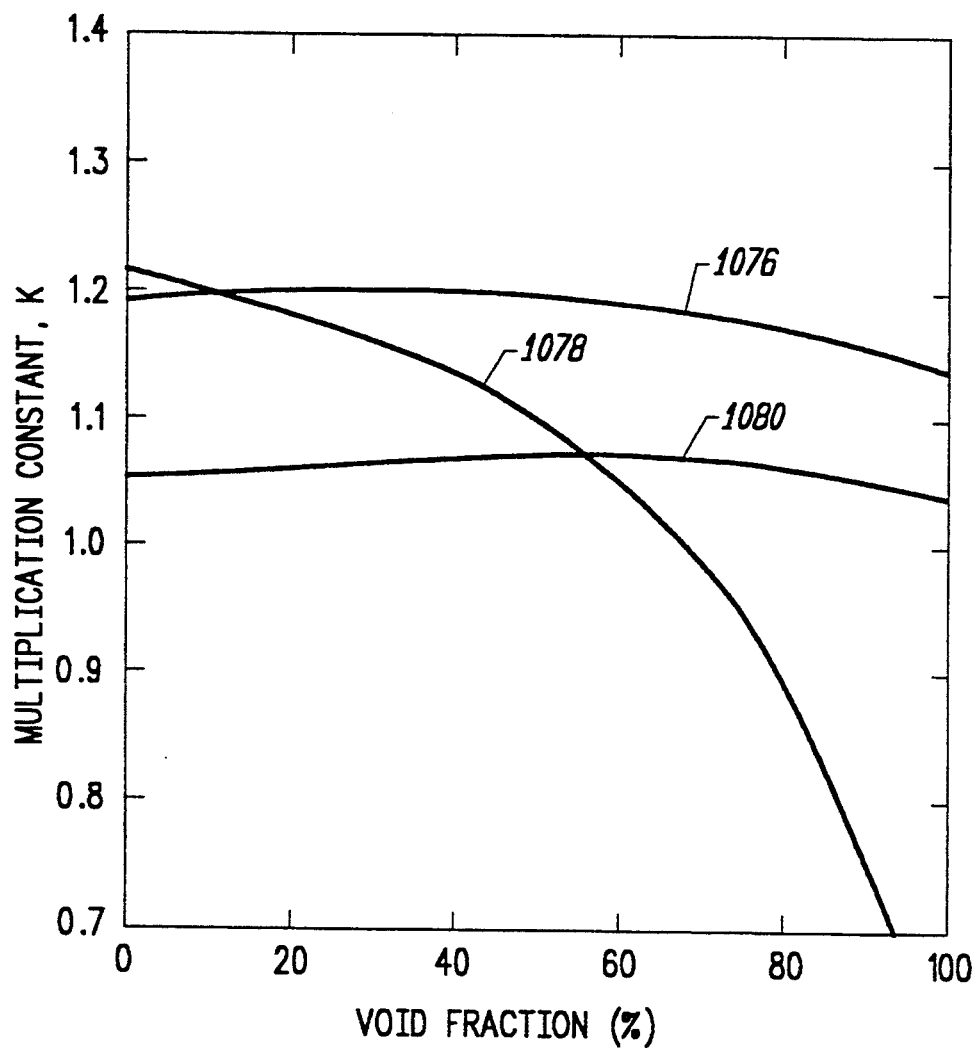
FIG. 10 compares the beginning-of-cycle multiplication constant calculated for an infinite array of all-hydride fuel rods and of all-oxide fuel rods as a function of the void (i.e., steam volume) fraction.

Curve 1076 (FIG. 10) is multiplication constant K for the lattice of hydride fuel rods with 3.0% uranium enrichment. Curve 1080 is multiplication constant K for the lattice of hydride fuel rods with 2.07% uranium enrichment. Curve 1078 is multiplication constant K for the lattice of oxide fuel rods with 2.07% uranium enrichment. The curves in FIG. 10 represent the multiplication constant at different axial elevations in that part of the BWR core where boiling occurs. In the high void fraction regions of the core, the multiplication constant of the hydride fuel lattices, curves 1076 and 1080, exceeds that of the oxide fuel lattice, curve 1078. The higher the void volume fraction, the larger is the reactivity improvement offered by the hydride fuel. The multiplication constant of the hydride fuel lattices vary only slightly with the change in the steam volume fraction in comparison to the variation of the multiplication constant with the void fraction in the oxide fuel lattices.

In view of the large amount of zirconium present in the hydride fuel lattices relative to the amount of zirconium in the oxide fuel lattices, it was surprising to find that the multiplication constant of $U-ZrH_{1.6}$ fuelled lattices can be comparable and even higher than the multiplication constant of similar $UO_2$ fueled lattices, when both the oxide and hydride fueled lattices use LEU of the same enrichment. As described above, only MEU and HEU was used so far for uranium-zirconium hydride fuel. This unexpected finding is due to the fact that in the high void fraction lattices, the improvement in the neutron moderation provided by the hydrogen of the hydride fuel more than compensates for the increase in the probability for neutron absorption in the zirconium.

Table 2 compares the multiplication constant of a lattice of identical BWR fuel rods with and without hydride fuel. Six lattice compositions are considered for this comparison; they represent the fuel composition and steam volume fraction found in six elevations, or axial locations, in the core. The fuel design is as described in connection with FIG. 10. In a first embodiment, "all-oxide", the array contained uranium oxide fuel $UO_2$ having an enrichment of 2.07%. In a second embodiment, "mixed hydride-oxide", the uranium oxide in the upper half of the fuel rod is replaced by the hydride fuel ($U-ZrH_{1.6}$) in which the uranium is enriched to 3.0%. Table 2 shows that whereas with the all-oxide fuel the multiplication constant strongly declines towards the top of the fuel rod (or core), the use of hydride fuel brings the multiplication constant at the upper part of the core to practically its value at the bottom of the core.

The improved moderation and increased reactivity resulting from the substitution of hydride fuel for oxide fuel in the upper region of the core make the axial power distribution more uniform without the use of either burnable poisons or control rods. One benefit of the flatter axial power distribution is an improved fuel utilization. Another benefit of the flatter axial power distribution is a larger safety margin against fuel meltdown in case of accidents. Yet another benefit of the flatter axial power distribution is a higher effectiveness of the BWR control rods

TABLE 2

| Axial Distribution of the Multipication Constant With and Without Hydride Fuel | | | | | | |
|---|---|---|---|---|---|---|
| Axial core zone (from Bottom) | 1/6 | 2/6 | 3/6 | 4/6 | 5/6 | 6/6 |
| All-oxide | 1.21 | 1.18 | 1.11 | 1.07 | 1.04 | 1.02 |
| Mixed hydride-oxide | 1.21 | 1.18 | 1.11 | 1.21 | 1.20 | 1.19 | towards the end of the irradiation cycle and, hence, a smaller period of time for scramming the reactor.

Moreover, the reactivity swing associated with the transition from full power operation to low or zero power operation is substantially smaller with hydride fuel rather than oxide fuel occupying the high void fraction part of the core, i.e., the most undermoderated region of the core. This behavior is demonstrated by curves 1076 and 1080 of FIG. 10 which show that the void fraction dependence of the hydride fuel lattice multiplication constant is significantly flatter than the corresponding dependence for the oxide fuel lattice, curve 1078 of FIG. 10. The smaller the reactivity swing, the larger the cold shutdown reactivity margin which is a positive safety feature.

Another improvement in the BWR economics and safety is derived from the increase in the total length of fuel rods in the BWR core made possible by using hydride fuel in place of the water rods used in the prior art BWR fuel assemblies. (Note: any particular fuel rod is not being increased in length, but as fuel rods substitute for water rods, the total length of fuel pellets in the assembly and, therefore, in the core, is increased.) The increase in the total length of fuel in the core lowers the maximum power density the reactor needs to operate at if the reactor is to deliver a given total power output. One benefit of the increase in the total length and mass of fuel is an increase in the amount of electricity which the BWR can generate in between refuellings. Another benefit of the increase in the total length and mass of fuel in the assembly is an increase in the fuel residence time in the core. The increased fuel residence time in the core increases the reactor operation time between refueling outages thereby increasing the reactor availability and reducing the cost of generating electricity. Yet another benefit of the increase in the total length of fuel in the assembly is lowering of the maximum power density and linear-heat-rate, thus increasing the safety margin against fuel meltdown accidents.

Finally another advantage of the present invention is that the leakage of energetic neutrons out of the upper part of the core is reduced relative to the neutron leakage from oxide fuel in the prior art BWR fuel assemblies. The reduced leakage of energetic neutrons increases the core reactivity and reduces the neutron induced damage to structural components located in the vicinity of the core.

In another embodiment of the present invention, rather than operating the BWR at a reduced peak power density, the BWR with the novel fuel rods of this invention is operated with the same maximum power density as in the prior art and thereby benefit from the flatter power distribution and larger accumulated fuel rod length by running the hydride fueled core at a higher power level. This may not be achievable in certain of the existing BWRs in which the heat transport and energy conversion system are not capable of accommodating an increase in the power output. However, the design of new BWRs could take full benefit from this feature. That is, the hydride fuel makes it possible to design more compact BWRs than existing BWRs, i.e., the same total power output is obtained from a smaller size core, making the reactor more economical.

The maximum linear-heat-rate BWR oxide fuel rods are designed to deliver is, typically, 450 watts per cm. When operating at such a linear-heat-rate, the temperature at the center of the oxide fuel is in the vicinity of 1800° C. The thermal conductivity of the uranium-zirconium hydride fuel, 17.6 watts/m° K., is significantly higher than that of an oxide fuel, which is typically about 2.8 watts/m° K. As a result, if the hydride fuel is to operate at 450 watts per cm, its central temperature will be only about 700° C.

Part of the improvements and benefits described above can be achieved by replacing only water rods in the central part of conventional all-oxide BWR fuel assemblies by all-hydride, or predominantly hydride fuel rods.

By using hydride rods instead of the water rods, the improved moderation and power flattening across the fuel assembly are achieved without a reduction in the overall length of fuel rods in the assembly. Consequently, the optimal number of all-hydride fuel rods in the BWR fuel assembly that is designed in accordance with the present invention is likely to be larger than the number of water rods in conventional designs of BWR fuel assemblies. Thus, hydride fuel rods can flatten the power density distribution across the BWR fuel assembly better than water rods or than rods containing fuel free solid moderator. The consequences are improved fuel utilization, longer fuel residence time, improved safety or, alternatively, increased power output per assembly.

The inclusion of fissionable material with the hydride of the hydride fuel reduces the probability that moderated neutrons will be absorbed in the hydride and in the cladding relative to the absorption probability in fuel assembly designs which have the same hydride moderator but without fissionable material. For example, relative to the zirconium hydride moderator sections proposed in the above-identified Weitzberg patent, the probability of neutron loses through absorption in the zirconium of the solid moderator is reduced by two orders of magnitude. The reduction in the neutron absorption in the zirconium of the solid moderator increases the reactivity of the core and improves the fuel utilization relative to that achievable with solid moderators.

Accordingly, the use of hydride fuel in combination with oxide fuel according to the principles of this invention improves the moderation of BWR cores while maximizing the total length of fuel rods in these cores. As a result, BWR cores can be designed to have a flatter power distribution; a smaller amount of burnable poisons; a reduced neutron absorption in control rods; and a reduced leakage of neutrons from the core. The benefits from these improvements in BWR cores include a better fuel utilization; a longer fuel residence time and a larger amount of energy generation between refuelling periods, and, therefore, an increased availability; or a higher total power output from a core of a given size. These advantages improve the economics of generating electricity from BWRs. Additional improvements of the present invention include a larger cold shutdown reactivity margin, a shorter time for scramming the reactor, and a larger safety factor against fuel meltdown accidents. These advantages improve the safety of BWRs. In addition, the reduced leakage of energetic neutrons out of the upper part of the core reduces the damage rate to structural components.

Although the description is illustrative of the principles of this invention, the description should not be construed as limiting the scope of the invention, but as merely providing illustrations of some of the presently preferred embodiments of this invention. In view of this disclosure, it will be apparent to those skilled in the art that the hydride fuel can be included in the fuel rod in different combinations with oxide fuel and with segments of water or of solid moderators; the uranium in the hydride and oxide fuel can be of different enrichment; the hydride fuel can be made of thorium hydride rather than of zirconium hydride; the hydride fuel can contain different number of hydrogen atoms per zirconium or thorium atom; the cladding of the fuel rod which contains hydride pellets can be made of a material different than zirconium or its alloy, such as stainless steel, or of stainless steel or glass enamel coated zircaloy; the hydride fuel can be made of small fuel particles imbedded in the solid moderating material; and the fuel rod and fuel assembly can be of different dimensions and different designs. Accordingly, the scope of this invention should be determined not by the embodiments illustrated, but by the appended claims and their legal equivalents.

I claim:

1. In a boiling water reactor, a fuel assembly comprising a plurality of fuel rods wherein at least a multiplicity of fuel rods in said plurality of fuel rods each includes a first fueled region containing an oxide fuel and an axially adjacent second fueled region containing a hydride fuel, said hydride fuel functioning simultaneously as a fuel and as a neutron moderator within said assembly.

2. The fuel assembly as claimed in claim 1 wherein said second fueled region in each of said multiplicity of fuel rods is located in a region surrounded by boiling coolant with a void fraction in the range of greater than about zero percent to about seventy percent.

3. The fuel assembly as claimed in claim 1 wherein said fuel assembly includes a first multiplicity of fuel rods, each of said fuel rods having a first fueled region containing an oxide fuel, and a second fueled region containing a hydride fuel and the remaining fuel rods in said plurality of fuel rods each contain only oxide fuel.

4. The fuel assembly as claimed in claim 3 wherein said remaining fuel rods in said plurality of fuel rods are located in an exterior region of said fuel assembly, and said multiplicity of fuel rods are surrounded by said remaining fuel rods.

5. The fuel assembly as claimed in claim 1 wherein said fuel assembly includes a first multiplicity of fuel rods each of said rods having a first fueled region containing an oxide fuel and a second fueled region containing a hydride fuel, and the remaining fuel rods in said plurality of fuel rods each contain only hydride fuel.

6. The fuel assembly as claimed in claim 5 wherein the remaining fuel rods in said plurality of fuel rods are located in an interior region of said fuel assembly and said multiplicity of fuel rods surround the remaining fuel rods in said plurality.

7. The fuel assembly as claimed in claim 1 wherein said fuel assembly includes a second multiplicity of fuel rods, each of said rods containing only an oxide fuel, and a third multiplicity of fuel rods, each of said fuel rods in said third multiplicity containing only a hydride fuel.

8. The fuel assembly as claimed in claim 1 wherein said moderator is zirconium hydride.

9. The fuel assembly as claimed in claim 8 wherein said zirconium hydride has a hydrogen concentration in the range of about 1.0 to about 2.0 hydrogen atoms per zirconium atom.

10. The fuel assembly as claimed in claim 9 wherein said zirconium hydride has a hydrogen concentration of about 1.6 to about 1.7 hydrogen atoms per zirconium atom.

11. The fuel assembly as claimed in claim 1 wherein said hydride in said hydride fuel as thorium hydride.

12. The fuel assembly as claimed in claim 11 wherein said thorium hydride has a hydrogen concentration in the range of about 1 to about 3 hydrogen atoms per thorium atom.

13. The fuel assembly as claimed in claim 11 wherein said thorium hydride has a hydrogen concentration of about 2 hydrogen atoms per thorium atom.

14. The fuel assembly as claimed in claim 1 wherein said fuel in said hydride fuel is uranium.

15. The fuel assembly as claimed in claim 14 wherein said hydride fuel is a uranium zirconium hydride.

16. The fuel assembly as claimed in claim 15 wherein said uranium zirconium hydride has a uranium concentration ranging from about 30 to about 60 weight percent.

17. The fuel assembly as claimed in claim 16 wherein said uranium is enriched to contain about 2 percent to about 6 percent uranium-235.

18. The fuel assembly as claimed in claim 14 wherein said hydride fuel is uranium thorium hydride.

19. The fuel assembly as claimed in claim 18 wherein said uranium thorium hydride has a uranium concentration ranging from about 30 to about 60 weight percent.

20. The fuel assembly as claimed in claim 19 wherein said uranium is enriched to contain about 2 percent to about 6 percent uranium-235.

21. The fuel assembly as claimed in claim 1 comprising a plurality of fuel rods wherein a first multiplicity of fuel rods in said plurality of fuel rods each includes a first fueled region containing oxide fuel pellets as the fuel and an axially ajacent second fueled region containing hydride fuel pellets as the fuel, and a second multiplicity of fuel rods in said plurality of fuel rods, each includes only oxide pellets as the fuel.

22. The fuel assembly as claimed in claim 21 wherein said plurality of fuel rods further comprise a third multiplicity of fuel rods, each of which includes only hydride fuel pellets as the fuel.

23. The fuel assembly as claimed in claim 1 comprising a plurality of fuel rods wherein a first multiplicity of fuel rods in said plurality of fuel rods each includes a first fueled region containing oxide fuel pellets as the fuel and an axially ajacent second fueled region containing hydride fuel pellets as the fuel, and a second multiplicity of fuel rods in said plurality of fuel rods, each includes only hydride fuel pellets as the fuel.

24. In a boiling water reactor, a fuel assembly comprising a plurality of fuel rods, a multiplicity of said fuel rods containing only an oxide fuel and the remaining fuel rods in said plurality of fuel rods containing only a hydride fuel, said hydride fuel functioning simultaneously as a fuel and as a neutron moderator within said assembly.

25. The fuel assembly as claimed in claim 24 wherein said remaining fuel rods are located in an interior region of said assembly and said multiplicity of fuel rods surround said remaining fuel rods in said assembly.

26. The fuel assembly as claimed in claim 24 wherein said first multiplicity of fuel rods in said plurality of fuel rods each includes only oxide fuel pellets as the fuel, and said remaining fuel rods each includes only hydride fuel pellets as the fuel.

27. A method of compensating for insufficient moderation of neutrons while maximizing the total fueled region of fuel rods in a boiling water reactor fuel assembly of the type containing a plurality of elongated fuel rods and a multiplicity of water rods, said fuel rods being vertically oriented therein, having oxide fuel pellets therein, and being surrounded by water which boils as it removes the heat generated in said fuel rods, comprising:

replacing oxide fuel pellets in specific regions of each of a first multiplicity of said fuel rods with pellets made of hydride fuel so that said uranium oxide pellets and said hydride fuel pellets are distributed in axially adjacent regions of each of said fuel rods, said specific regions in said fuel rods being located in a region surrounded by boiling coolant with a void fraction in the range of greater than zero percent to less than about seventy percent, said hydride fuel in said first multiplicity of fuel rods, when inserted in said reactor, enhancing moderation of neutrons in said boiling part of said coolant of said fuel assembly of said reactor to compensate for reduced moderation provided by steam voids created in said water which boils as said water cools said fuel rods, while maximizing total amount of fuel in each of said fuel rods.

28. A method according to claim 27 of compensating for insufficient moderation of neutrons while maximizing the total fueled region of fuel rods in a boiling water reactor fuel assembly of the type containing a plurality of elongated fuel rods and a multiplicity of water rods, said fuel rods being vertically oriented therein, having oxide fuel pellets therein, and being surrounded by water which boils as it removes the heat generated in said fuel rods, comprising the further steps of:

replacing said water rods with fuel rods filled with hydride fuel pellets, said hydride fuel replacing water in said water rods, and when inserted in said reactor, maintaining moderation of neutrons in said water rod locations in said fuel assembly of said reactor while increasing total volume and total length of fuel in said fuel assembly; and replacing a second multiplicity of said fuel rods having uranium oxide fuel pellets with fuel rods filled with hydride fuel pellets, said hydride fuel replacing said oxide fuel in said second multiplicity of fuel rods, and when inserted in said reactor, functioning as a fuel in said fuel assembly while improving moderation of neutrons in said fuel assembly.

29. A method of compensating for insufficient moderation of neutrons while maximizing the total fueled region of fuel rods in a boiling water reactor fuel assembly of the type containing a plurality of elongated fuel rods and a multiplicity of water rods, said fuel rods being vertically oriented therein, having oxide fuel pellets therein, and being surrounded by water which boils as it removes the heat generated in said fuel rods, comprising:

replacing said water rods with fuel rods filled with hydride fuel pellets, said hydride fuel replacing water in said water rods, and when inserted in said reactor, maintaining moderation of neutrons in said water rod locations in said fuel assembly of said reactor while increasing total volume and total length of fuel in said fuel assembly.

30. A method according to claim 29 of compensating for insufficient moderation of neutrons while maximizing the total fueled region of fuel rods in a boiling water reactor fuel assembly of the type containing a plurality of elongated fuel rods and a multiplicity of water rods, said fuel rods being vertically oriented therein, having oxide fuel pellets therein, and being surrounded by water which boils as it removes the heat generated in said fuel rods, comprising the additional step of:

replacing a multiplicity of said fuel rods having oxide fuel pellets with fuel rods filled with hydride fuel pellets, said hydride fuel replacing said oxide fuel in said multiplicity of fuel rods, and when inserted in said reactor, functioning as a fuel in said fuel assembly while improving moderation of neutrons in said fuel assembly.

* * * * *